United States Patent [19]

Dussault et al.

[11] Patent Number: 4,841,733
[45] Date of Patent: Jun. 27, 1989

[54] DRI-PAC HUMIDITY AND TEMPERATURE CONTROLLER

[76] Inventors: David R. Dussault, 24 Roosevelt Ave., Hudson, N.H. 03051; Richard E. Dussault, P.O. Box 250, Mirror Lake, N.H. 03853

[21] Appl. No.: 141,630

[22] Filed: Jan. 7, 1988

[51] Int. Cl.$^4$ .............................................. F25D 17/06
[52] U.S. Cl. ...................... 62/93; 62/176.6; 236/49.1; 236/44 C; 165/909; 165/16
[58] Field of Search .................. 62/89, 90, 173, 408, 62/409, 410, 411, 412, 176.1, 176.5, 176.6, 93; 236/44 R, 44 A, 44 C, 49; 165/16, 909; 98/1.5, 32, 33.1, 34.5, 34.6

[56] References Cited

U.S. PATENT DOCUMENTS

| | | | |
|---|---|---|---|
| 3,951,336 | 4/1976 | Miller et al. | 98/1.5 |
| 3,963,461 | 6/1976 | Stockford et al. | 165/60 X |
| 4,044,947 | 8/1977 | Spethmann | 165/16 X |
| 4,071,080 | 1/1978 | Bridgers | 62/412 X |
| 4,210,278 | 7/1980 | Obler | 236/49 |
| 4,399,864 | 8/1983 | Lamar | 236/44 C |
| 4,517,810 | 5/1985 | Foley et al. | 62/186 |

Primary Examiner—Harry B. Tanner
Attorney, Agent, or Firm—Samuels, Gauthier, Stevens & Kehoe

[57] ABSTRACT

A temperature and humidity control system for natatoriums. The system provides a constant volume of air circulation which is used to control temperature and humidity in the natatorium while inhibiting the accumulation of moisture on the surfaces defining the natatorium. Usually, ambient air is introduced into the system and moisture latent air discharged from the system under controlled conditions. When the humidity of the ambient air is too great the system operates in a self-contained cycle. Return air from the natatorium flowing through the system is treated to maximize its relative humidity. Subsequently, it flows across a cooling coil. This cooled air flows through a heat exchange module where it is placed in exchange relationship with the air being drawn from the natatorium. It cools the air drawn from the natatorium to maximize its relative humidity and this air in turn flows across the refrigeration coil removing substantial quantities of moisture. Combining the refrigeration coil with the heat transfer module and the other components in the system, the sensible/latent heat split is shifted towards higher latent output increasing the overall efficiency of the system as a dehumidification device.

23 Claims, 7 Drawing Sheets

DRI-PAC SCHEMATIC
ALTERNATIVE EMBODIMENT NO. 3
REFRIGERATION MODULE

DRI-PAC HUMIDITY AND TEMPERATURE CONTROLLER

BACKGROUND AND BRIEF SUMMARY OF THE INVENTION

This invention relates to an apparatus and method for improving ventilation in the form of humidity and temperature control especially when applied to the control of moisture in indoor swimming pool environments (natatoriums).

Natatoriums are typically operated at high humidity levels as compared to standard living space to provide creature comfort to wet-bodied inhabitants. This high humidity level (dew point) creates condensation on the surfaces of building components. In addition to being disagreeable aesthetically, the constant presence of condensation promotes the growth of mildew and fungi and may greatly accelerate deterioration of both surface and internal building components.

Natatoriums place two specific demands on a high volume air conditioning (HVAC) system which are unqiue: the system must remove a relatively constant amount of moisture which migrates into the air by evaporation of the pool surface; and the air system must be equipped to deliver a constant supply of warm/dry air which can be directed toward condensation-prone building components, such as windows.

Humidity control has typically been attempted by implementing standard ventilation systems. In these systems, exhaust/intake fans may be cycled on and off either manually or by "make/break" humidity controllers. This same general approach can be combined with space heating equipment in the form of direct or indirect fired make-up-air systems. Electric, hydronic or steam heaters may also be employed as heat source in make-up-air equipment.

Both versions of the straight ventilation approach to humidity control have serious drawbacks. Because the blowers are either on or off, great swings in humidity and temperature conditions result, especially when both heat and outside air are delivered through the same on/off make-up-air unit. During colder weather the heating demands of the pool space will cause the standard make-up-air system to run longer than would be required to satisfy the moisture removal requirement in order to produce adequate heat. The surplus of outside air causes the humidity level within the pool environment to drop below the comfort level. Even though the heater may keep the air temperature at 80 degrees or more when the relative humidity drops much below 50-60% relative humidity evaporation on the skin of wet bodies using the pool results in the sensation of being cold. This condition may be expected when the relative humidity level drops much below the 50-60% level.

The standard ventilation systems as described above do not have the ability to provide a continuous supply of air to windows and other condensation-prone surfaces. When the system is "on" the airflow is available to "wipe" these surfaces. Between cycles when the system is "off" the airflow ceases and immediately condensation begins to form on susceptible surfaces.

If the fans are kept in operation continuously to establish the desired constant air flow, wide temperature swings will result. In addition this continuous air exchange will drive the relative humidity to extremely low and uncomfortable levels.

One of the worst drawbacks of the standard ventilation systems is the operating cost. Heating 100% make-up-air, especially in colder climates, is completely unacceptable in light of high utility costs.

Some attempts have been made to address the humidity and temperature control requirements of indoor swimming pools with mechanical refrigeration or heat pump equipment. These systems remove moisture by circulating air from the natatorium through a chilled coil whereby water is condensed out of the air stream before it is introduced back into the defined indoor space. These systems typically produce the same fluctuations in temperature and humidity because the method of control is "make/break". There is often a conflict in the operational modes of the heat pump where adequate dehumidification and heat output can not be derived at the same time (so the air becomes either too cold or too wet). Finally these compressor-bearing units require substantial electrical branch circuits to accommodate their relatively large draw of power.

The invention utilizes the simplicity of standard ventilation equipment in that few moving parts are required for operation. The only significant moving parts required for basic operation are two fans and a series of motorized dampers. This does not include the reheat section which may incorporate one of many types of heating sources (hydronic, electric, steam, gas or oil) and may rely on a remote source of heat such as a boiler.

The invention eliminates the temperature and humidity swings typical of any of the "make/break" systems by full modulation of the outdoor air intake/exhaust for humidity control and with full modulation of the reheat coil output.

By incorporating the energy recovery module into the exhaust/intake section of the system, most of the enormous cost of heating outside intake air may be saved.

Because the only significant electrical consumption by the invention is by its two fans, electrical requirements are greatly reduced as compared to compressor bearing refrigeration devices. This does not include the reheat coil which may be electric and therefore would increase the electrical requirement, however, space heating demand due to transmission loss on this coil would be virtually identical in any of the systems described.

The power consumed by the invention to effect the dehumidification process is substantially less than both the ventilation-type systems and the refrigeration-type systems because of the relatively low power requirement of the fan systems and the high efficiency energy recovery module.

Because of the limited number of moving parts and use of electronic controls the invention is reliable with a lower long-term cost of maintenance when compared to compressor bearing refrigeration units. Regular preventative maintenance consists of air filter maintenance and occasional lubrication of fan parts.

The present invention embodies a system and a method of controlling the moisture accumulation, the relative humidity and the temperature in a defined environment such as a natatorium. The moisture removal is effected by exchanging a variable amount of moisture-laden air for drier outdoor (ambient) air. The volume of air required is variable because the dryness of the outdoor air is variable. As the outdoor air gets drier the volume of air exchange required to compensate for the constant pool evaporation is reduced.

Constant indoor airflow which continuously wipes those surfaces prone to moisture accumulation is achieved by integrating the flow of outdoor air with the indoor air and discharging the same at a constant flow rate.

The flow of the outdoor air is modulated, based on the indoor humidity demand and the dryness of the outdoor air to ensure the indoor airflow remains at a constant level.

In a preferred embodiment of the invention, a modulating humidity/sensor control senses the indoor humidity condition and opens/closes exhaust/intake dampers until the humidity condition reaches the setpoint as selected at the humidity control. The exhaust damper is on the pressure-side (downstream) of a return fan which removes the moisture laden air from the environment. Also on the pressure side of the fan is a bypass damper through which flows the moisture laden air not discharged through the exhaust damper.

The intake damper is on the suction-side (upstream) of a supply fan. The intake damper controls the amount of outdoor air entering the system. The outside air and the moisture laden air flowing through the bypass damper are combined in a common plenum in which plenum is disposed a reheat coil on the suction side of the supply fan. This supply fan discharges the air back into the defined environment.

To maintain the indoor airflow through the return/supply loop constant, the fundamental characteristics of centrifugal blowers are applied. For a blower operating at a fixed speed (R.P.M.), the volume of air passing through the blower will be constant for a given static pressure loading across the blower inlet/discharge. That is, if the static pressure across the blowers is controlled at a constant level the airflow through the blower will also be constant.

A sensor reads the pressure differential across the blowers (bypass damper) and operates the bypass damper actuator open/closed to maintain the fixed static pressure reading (as determined by the fan performance curves).

The modulation of the face exhaust/intake dampers would normally tend to build/relieve the static pressure across the bypass damper, which would change the indoor airflow. However, the bypass damper pressure control "follows" the action of the intake and exhaust dampers holding the differential pressure and in turn the indoor airflow is held constant.

During this process heat energy is transferred from the exhaust air to the intake air by using a heat recovery device. This heat recovery minimizes the reheat necessary to bring the incoming dry air up to room temperature.

A reheat coil adds heat to the air in the common plenum to compensate for the space heating requirements as well as to reheat the incoming dry air.

Another desirable feature for indoor pool applications is to maintain the overall static pressure in the defined environment slightly negative with respect to the surrounding living spaces and outdoors. With this slight negative pressure the high-moisture content air is confined better within the natatorium. With a null or positive pressure, moisture tends to migrate outwardly into the surrounding living spaces as well as into building components where it can do damage.

In one alternative embodiment of the invention, a supplemental room static pressure sensor/control is used to ensure a predetermined room negative pressure is maintained. In this alternative embodiment, the exhaust and intake dampers are controlled independently.

As determined by certain design conditions some cooling may be required to maintain the defined environment at acceptable levels. That is, in some circumstances the outside air being drawn into the system may be at a higher temperature than the desired temperature within the room. Therefore, in another embodiment of the invention, by adding supplemental components to the system of the preferred embodiment, cooling of the incoming outside air may be accomplished without using traditional compressor driven mechanical refrigeration equipment.

In the previously described preferred embodiment, the invention relies on the dryness of the outside air to drive the dehumidification process. The system is most effective during dry winter months and/or in areas with relatively dry year-round climates.

In applications where the summertime outside humidity level approaches or exceeds the desired indoor humidity level, humidity control by ventilation becomes impractical, air exchange volumes become excessive. Installation and operating cost, because of increased equipment sizing, is also increased. In addition the required high indoor air flow required may cause noise and discomfort due to turbulence and drafts.

For climates where these conditions are encountered, in still another embodiment of the invention, mechanical refrigeration equipment is integrated into the system in a manner to maximize comfort and minimize energy consumption in all operational modes. Broadly, a refrigeration coil/damper module is combined with the system of the preferred embodiment. This module is joined at the outside air connections of the invention.

DESCRIPTION OF THE PREFERRED EMBODIMENT(S)

Figure 1:
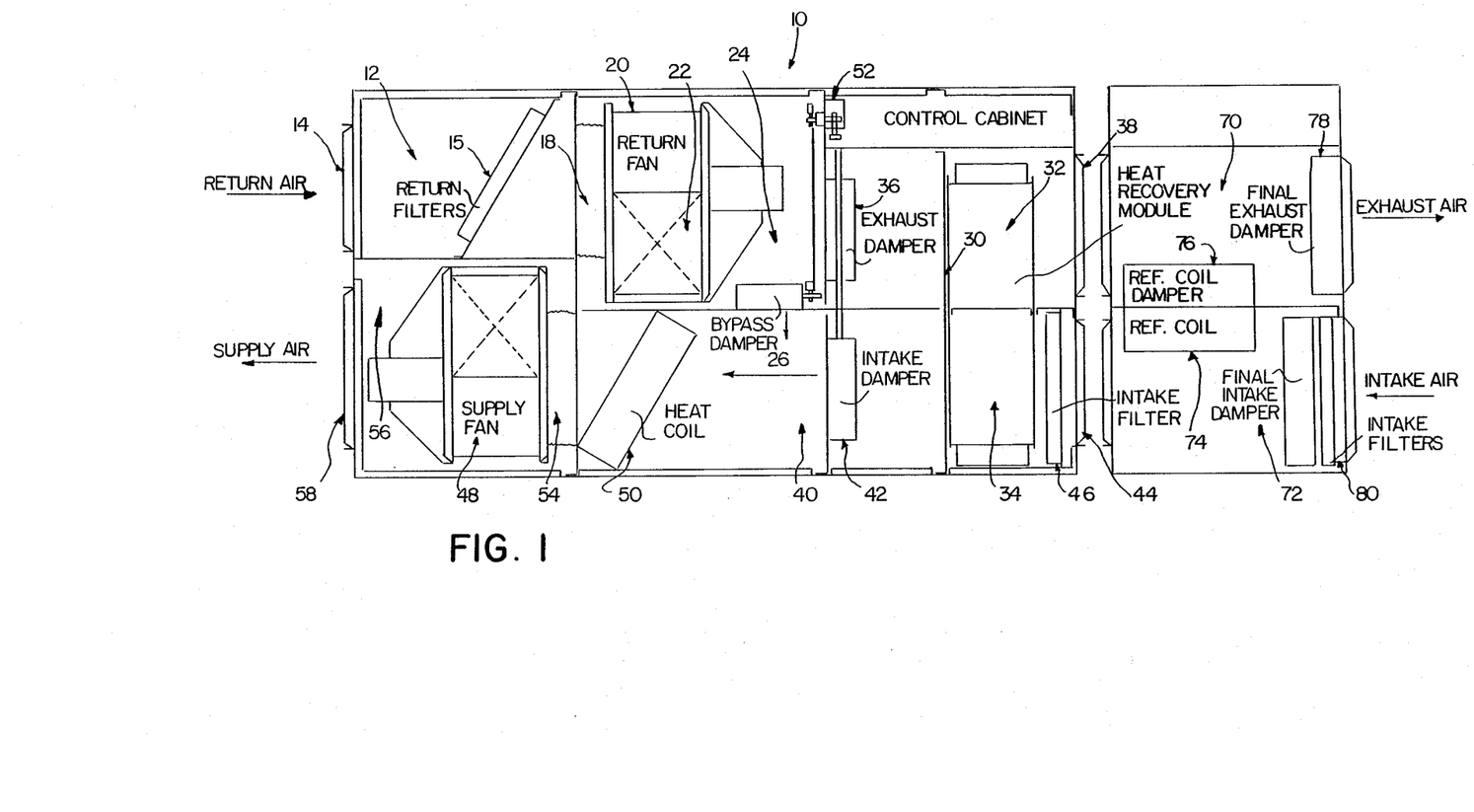
FIG. 1 is a plan view of a system embodying the invention.

Referring to the FIG. 1, a system 10 embodying the invention is shown generally with the top plate removed.

A return connector may be field installed in the top, bottom, side or end (as shown) to match the configuration of a field-installed air distribution system. That is, the system of the invention is adapted to be used with and/or incorporated into the ducts of existing air distribution systems. These prior art air distribution systems are configured to discharge air into a defined environment such as a natatorium. The discharged air, at least in part, contacts the surfaces where moisture accumulates and removes the moisture on a continual basis. The system of the invention may be installed with its own air distribution system or installed in an existing air distribution system. In either event with the inventive system the moisture is continuously, not continually, removed.

Indoor airflow is established by drawing moisture-laden air from the room into a return plenum 12 through a return connector 14. Air then passes through a filter bank 16 before flowing into the intake side 18 of a return fan 20. Air is discharged from the return fan outlet 22 pressurizing a return/exhaust plenum 24.

In this preferred embodiment, the fan 20 is controlled to run at a fixed speed. A bypass pressure sensor PS1 see FIG. 2, such as a Barber Coleman PP8516 with AD8501 reset module, measures the static pressure across downstream side of the fan 20 and upstream side of a supply fan 48 and this sensor PS1 actuates a motor driven bypass damper 26. Specifically, the signal from the AD8501 is transmitted to a Barber Coleman MP5430 hydraulic actuator which drives the damper 26 between its open and closed position.

A heat recovery module 30 has an exhaust side 32 and an intake side 34. Based on the position of an exhaust damper 36 a portion of the return air from the plenum 24 flows through the exhaust side 32 of the heat recovery module 30 and then to ambient through an exhaust connector 38.

The remaining portion of the return air passes from plenum 24 through the bypass damper 26 into a common plenum 40.

The intake side 34 of the heat recovery module 30 is in fluid flow communication with the plenum 40. An intake damper 42 is interposed between the intake side 34 and the plenum 40.

Based on the position of the intake damper 42 an amount of outside air is drawn through an outside air intake connector 44, an intake filter bank 46, the heat recovery module intake side 34 and into the common plenum 40 through the intake damper 42.

The heat recovery module 30 is a TRU 120 Series energy recovery module as manufactured by QDT Ltd., Dallas, Texas.

The bypassed return air from plenum 24 and the intake air from ambient are mixed in the plenum 40.

The mixed air in the plenum 40 passes through a heater coil 50 which adds enough heat to compensate for both the room heating requirement and the balance of the intake air reheat required after heat recovery.

Figure 2:
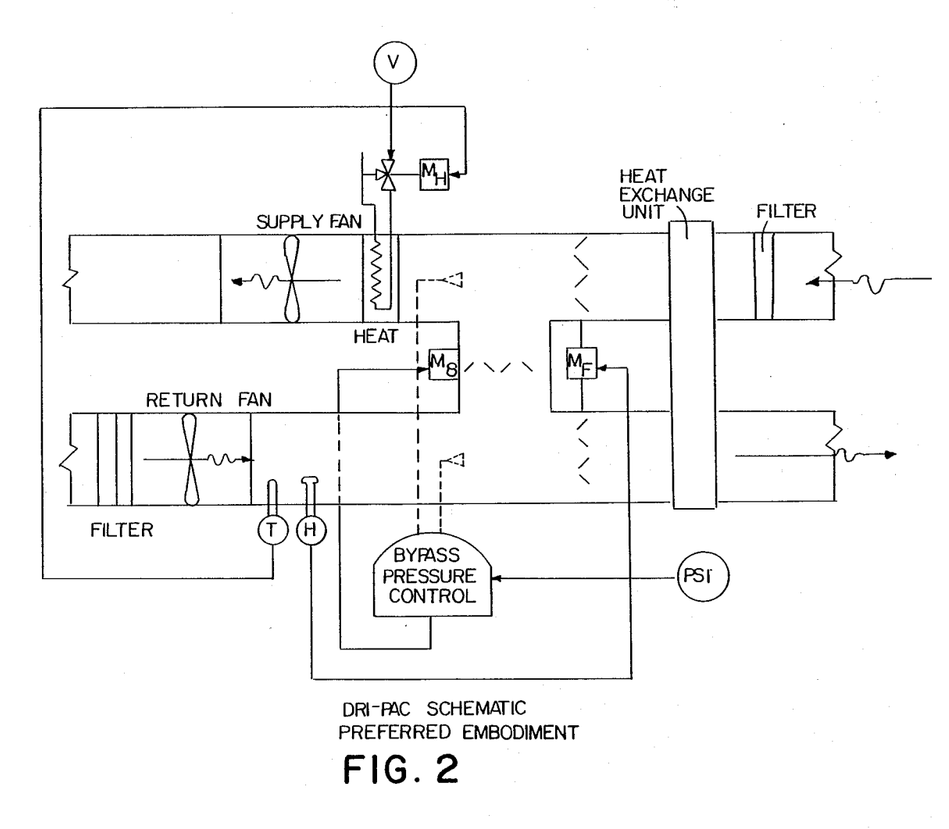
FIG. 2 is a schematic of the preferred embodiment.

In the preferred embodiment, a Barber Coleman VB9323 3-way water diverting valve, V, see FIG. 2, modulates the flow of hot water through a hydronic heating coil (not shown). The valve is operated by a Barber Coleman MP5410 hydraulic actuator according to a TS-8201-105 temperature sensor, T, see FIG. 2, mounted in the return/exhaust plenum 24; and a CP-8112 2-temperature input controller mounted in a control cabinet 52.

The heated air passes from the heater coil 50 to the intake 54 of the supply fan 48. This air is then discharged from the supply fan outlet pressurizing a supply plenum 56.

The air then flows to the field-installed air distribution system (not shown) through a supply connector 58 at a constant rate. The supply connector may be field installed in the top, bottom, side or end (as shown) to match configuration of field installed air distribution system.

Figures 6A, 6B:
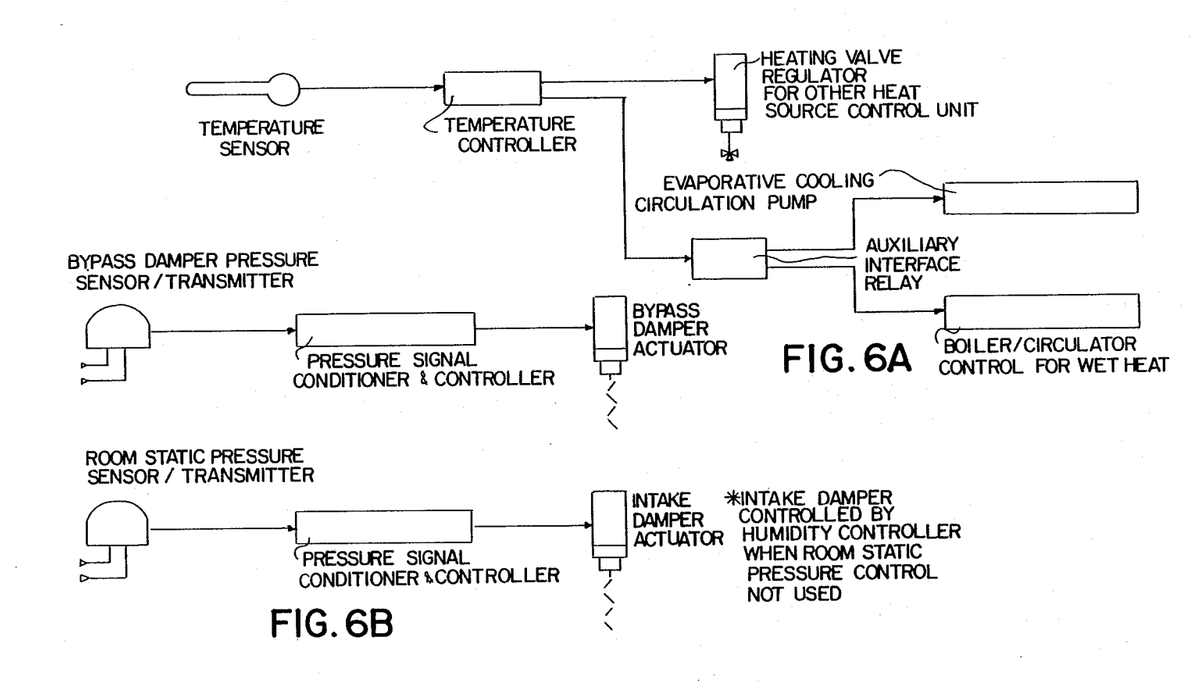
FIGS. 6a, 6b and 6c are schematics of the controls of the complete system.
Figure 6C:
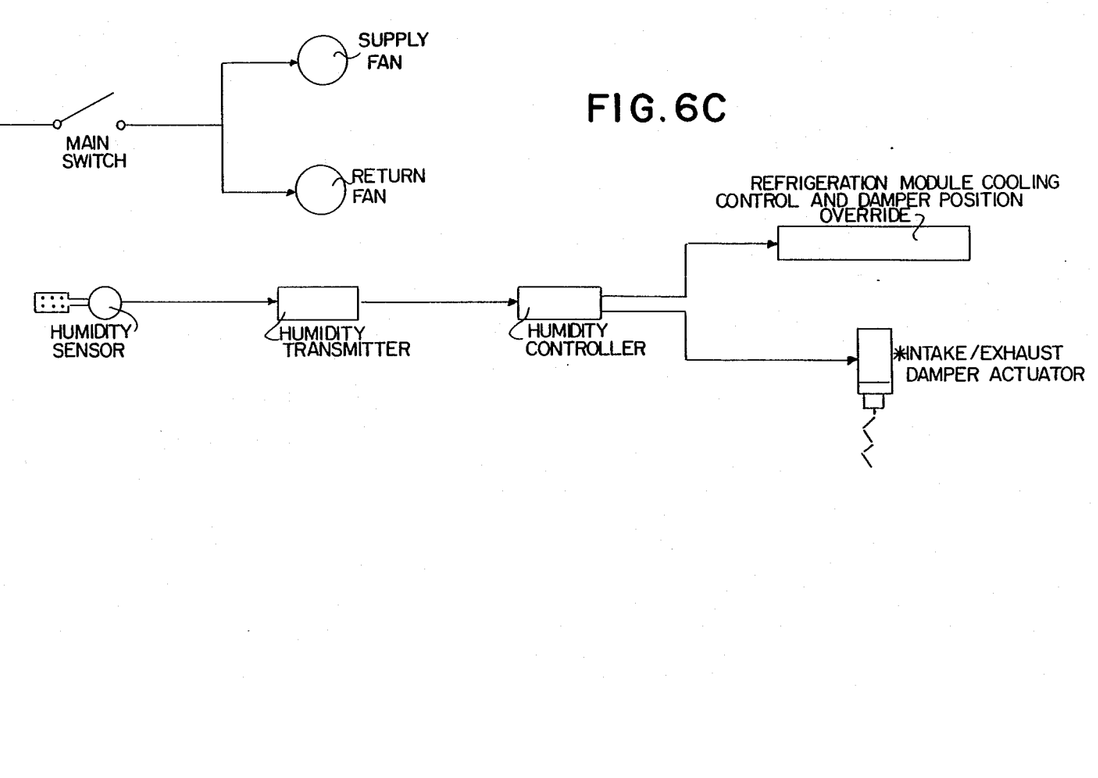

A Barber Coleman AH102 humidity sensor H see FIG. 2, is mounted in the return/exhaust plenum 24. It is used in combination with a HS8201 humidity transmitter and a CP8112 2-input controller mounted in the control cabinet 52. This combination controls a MP5430 intake/exhaust damper actuator which drives the dampers 36 and 42 open/closed according to humidity demand. These dampers, the intake damper 42 and the exhaust damper 36, may be linked for operation together based on humidity demand alone if negative room static pressure control is not desired. Where negative room static pressure is desired the humidity sensor/transmitter/controller combination (AH-102, HS8201, CP8112) may operate only exhaust damper 36 while a remote room static pressure controller, Dwyer 1640-0, PS2, a Dussault Engineering interface circuit (shown in FIG. FIG. 6) and a Barber Coleman AD-8501 reset module located in the control cabinet 52 operates the intake damper 42, as will be described.

In all normal modes of operation, (except the refrigeration mode to be described) the bypass damper 26 is positioned by the differential static pressure sensor/controller PS1 previously described. This Barber Coleman PP-8516 senses the pressure differential between return/exhaust plenum 24 and common plenum 40 and via the AD8501 reset module operates the bypass damper.

Since the static pressure exhibited in the supply and return air distribution system is fixed for a given air flow, maintaining a constant pressure differential between return/exhaust plenum 24 and the common plenum 40 creates a constant indoor air volume.

Outdoor air exchanged through exhaust connection 38 and an intake connection 44 is continuously variable from 0-100% of the system's nominal air flow depending on the indoor humidity demand and dryness of the available outside air.

At any intake/exhaust damper 42/36 position the indoor airflow is held constant by positioning the bypass damper 26 to maintain the static pressure across return fan 20 and supply fan 48 constant.

The operation of the invention will be explained in reference to the following non-limiting illustrative example.

The system 10 is incorporated into an existing air distribution system of a natatorium. The defined environment will be maintained at a negative pressure with respect to the outdoors/surrounding occupied area. The nominal indoor air flow rate of 4800 CFM is to be established for proper wiping of condensation-prone indoor surfaces. It may be assumed that to produce the desired negative pressure return air volume will need exceed the supply air volume by 100 CFM. That is, there will be 100 CFM more air volume evacuated from the natatorium space than returned to it through the supply duct system.

The desired indoor humidity and temperature levels to be maintained are 85° F. and 50% Relative Humidity. The desired temperature and humidity inputs are selected on the control panel. The nominal moisture loading by the pool is more or less fixed at 40 lbs. per hour. For this example, the beginning operating point for an outdoor condition of 20° F. and 95% R.H. would be selected.

At this operating condition and air exchange rate of 900 CFM exhaust and 800 CFM of intake air will be required to dissipate the 40 lb. per hour moisture load. At the steady state condition the air flow rates will be as follows:

| | |
|---|---|
| Return air volume: | 4800 CFM |
| Supply air volume: | 4700 CFM |

| -continued | |
|---|---|
| Exhaust air: | 900 CFM |
| Intake air: | 800 CFM |
| Supply/return bypass air: | 3900 CFM |

In this steady state condition, the 4800 CFM return air flow will be split; 900 CFM of exhaust to the outdoors and 3900 CFM bypassing to the supply/intake plenum. This 3900 CFM bypass air flow will combine with an 800 CFM flow of intake air to create the 4700 CFM supply air flow. Again, the return/exhaust air flow versus the supply/intake air flow differ by 100 CFM to create the negative static pressure within the defined environment.

Based on the percent humidity sensed in return/exhaust plenum 24, the exhaust damper 36 is positioned to allow a 900 CFM exhaust air flow rate. The room negative pressure sensor/controller PS2, FIG. 3, senses the differential pressure between the natatorium space and the surrounding areas, and adjusts the intake air damper 42 to allow an 800 CFM intake air flow. The return/supply bypass pressure sensor PS1 senses the pressure differential between return/exhaust plenum 24 and supply/intake plenum 40 and positions the bypass damper 24 using the fan performance data on the supply and the return fans used. For this example a pressure differential of 2" W.C. is necessary to fix the return/supply air flow at the proper 4800 CFM nominal air flow rating.

From this steady state operating condition at 20° F. and 95% relative humidity outdoor conditions, assume that the outdoor conditions now change to 30° F. and 95% relative humidity, the moisture content is now approximately 60% higher than at 20° F. and 95% relative humidity. At this new condition the more humid air has less capacity for drying the indoor air space, so at the steady state damper position for 20° F. and 95% relative humidity bringing in this higher humidity air will cause the moisture condition to drift to a higher level than the desired 50% relative humidity.

Immediately upon an upward drift in the humidity condition as sensed by the humidity sensor H in return-/exhaust plenum 24 the humidity controller will reposition the exhaust damper 36 to allow a greater air flow than was previously required at the 20° F. level. As exhaust damper 36 starts to open evacuating more air than the previous steady state condition, the desired negative room pressure will be upset. As the exhaust air flow begins to increase, while the intake air flow is held at the original 800 CFM level, the pressure differential between the natatorium space and surrounding areas begins to increase beyond the preset value. The room negative pressure sensor/controller PS2 senses this shift in the room static pressure and in turn repositions intake damper 42 to bring the exhaust/intake air flow balance to the proper level to create the desired static pressure condition. As the humidity controller opens the exhaust air damper 36 and in turn the room negative pressure sensor/controller follows opening the intake air damper 42, the pressure differential between return/exhaust plenum 24 and supply/intake plenum 40 is changed, upsetting the nominal air flow of the indoor loop. When the return/supply bypass pressure sensor PS1 senses the pressure change caused by the exhaust/intake dampers 36/42, the bypass damper 26 is adjusted by the return/supply pressure controller to maintain the proper indoor air flow.

As the outdoor condition shifts from 20° F. and 95% relative humidity to 30° F. and 95% R.H., the values for the system air flows will be modified as follows:

| Return air flow: | 4800 CFM |
|---|---|
| Exhaust air flow: | 1000 CFM |
| Supply air flow: | 4700 CFM |
| Intake air flow: | 900 CFM |
| Return/supply bypass air flow: | 3800 CFM |

Under this new steady state condition the 4800 CFM of return is split with 1000 CFM discharging through the exhaust to the outside, 3800 CFM passing through the bypass damper. This 3800 CFM bypass air is mixed with the 900 CFM of intake air to produce the 4700 CFM supply air flow. Noting that there is still the desired 100 CFM differential between the return/exhaust air flow and the supply/intake air flow creating the desired negative pressure within the defined space.

Independent of the humidity control, room temperature is sensed in the same return/exhaust plenum 24. As the room temperature has a tendency to drift upwards or downwards in response to higher or lower building heating loss and/or changes in the amount of outside air which must be reheated to room condition, the temperature controller T repositions the 3-way diverting valve V which supplies the hydronic heating coil in a typical unit. A similar control scheme may be applied to alternate forms of reheat, such as electric, steam, or other. Typically, an external boiler is required to supply either hot water or steam to the basic reheat coil.

This process of varying the outdoor exchange rate while maintaining a constant indoor air flow is fully modulating from the minimum position, which would be 100 CFM exhaust, 0 CFM intake air, with 4700 CFM bypassed directly from the return/exhaust plenum 24 to the supply/intake plenum 40. This minimum position would be approached as the outdoor temperature dropped to very low levels and in turn the moisture content within that air dropped in a corresponding manner.

The high end air flow parameters as the outdoor air temperature increases along with the outdoor humidity condition would by 0 CFM bypass from the return/exhaust plenum 24 to the supply/intake plenum 40 with 4800 CFM of air being discharged directly through the exhaust damper and heat recovery module to the outdoors and 4700 CFM of air being drawn through the intake filters heat recovery module and damper section to be discharged.

Figure 3:
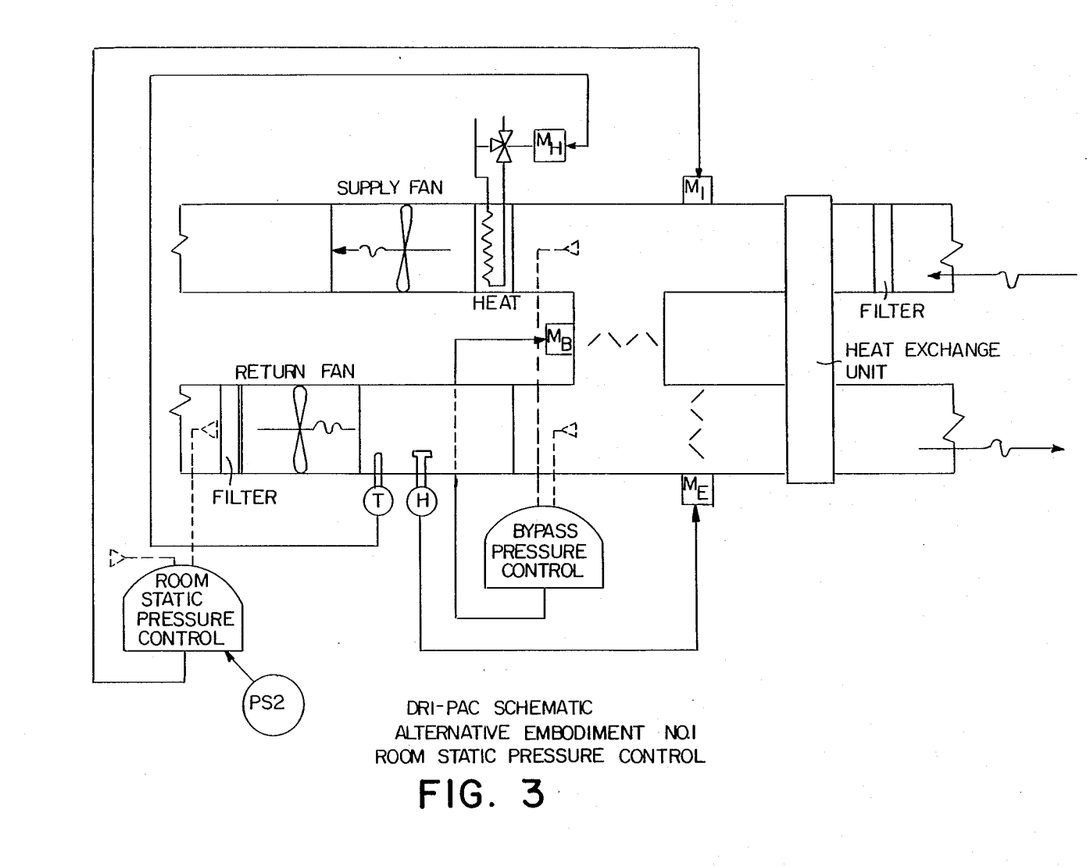
FIG. 3 is a schematic of the first alternative embodiment.

Referring to FIG. 3, in one alternative embodiment of the invention, the control system of the preferred embodiment is modified so that the humidity controller operates only the exhaust air damper. When the exhaust air damper 36 is modulated by itself there is a tendency to evacuate or pressurize the room. The supplemental room static pressure controller PC2 senses the change and readjusts the intake air damper 42 so that a predetermined room negative pressure condition is maintained. When the humidity controller H changes the position of the exhaust damper 36, the pressure controller PC2 "follows" the changes and repositions the intake damper 42. The bypass static pressure controller PC1 in turn "follows" the combined action of the exhaust/intake dampers holding the indoor airflow constant.

The heat recovery module 30 used in the system is a bi-directional heat transfer device. Heat may be transferred from the exhaust air stream to the incoming air stream when intake air reheat is desired or from the intake air to the exhaust air stream when heat removal (cooling) is desired. The parameter which determines the direction of flow is temperature differential. Heat flows from the higher temperature face to the lower temperature face within the heat recovery module.

Under summer operating conditions, without supplemental components it is difficult to remove heat from the outside air since the 80 or 90 degree incoming air is almost at the same temperature as the 80 degree air exhausted. Little or no temperature difference results in little or no heat transfer transfer.

Figure 4:
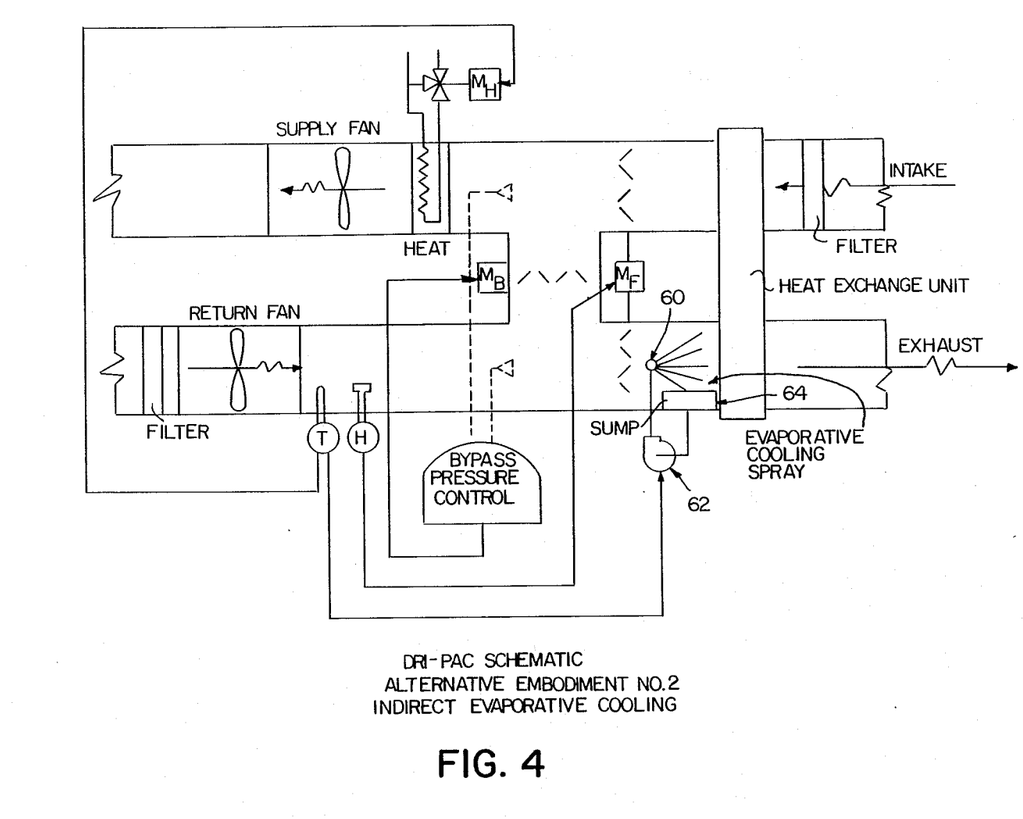
FIG. 4 is a schematic of the second alternative embodiment.

In another embodiment of the invention, referring to FIG. 4, supplemental components required to depress the face temperature of the exhaust side of the heat recovery module low enough for a significant cooling effect on the intake air are a water spray nozzle 60, pump 62 and a sump 64.

A fine mist of water is sprayed on the exhaust face of the heat transfer module causing "evaporative cooling" to take place. The evaporation of the water from the exhaust face of the heat recovery unit cools the face creating a temperature differential with respect to the intake face required to draw heat from the hot incoming air and transfer it to the exhaust air.

The spray pump 62 is cycled on and off and therefore, the cooling effect is also turned on and off. The cycling of the water spray mechanism is controlled by the same temperature/sensor control T which operates the reheat coil 50.

The water spray is discharged between the exhaust damper and the exhaust face of the heat recovery module.

This feature allows cooling in many applications without the electrical requirements, operating cost, and maintenance complications associated with compressor bearing refrigeration equipment.

Figure 5:
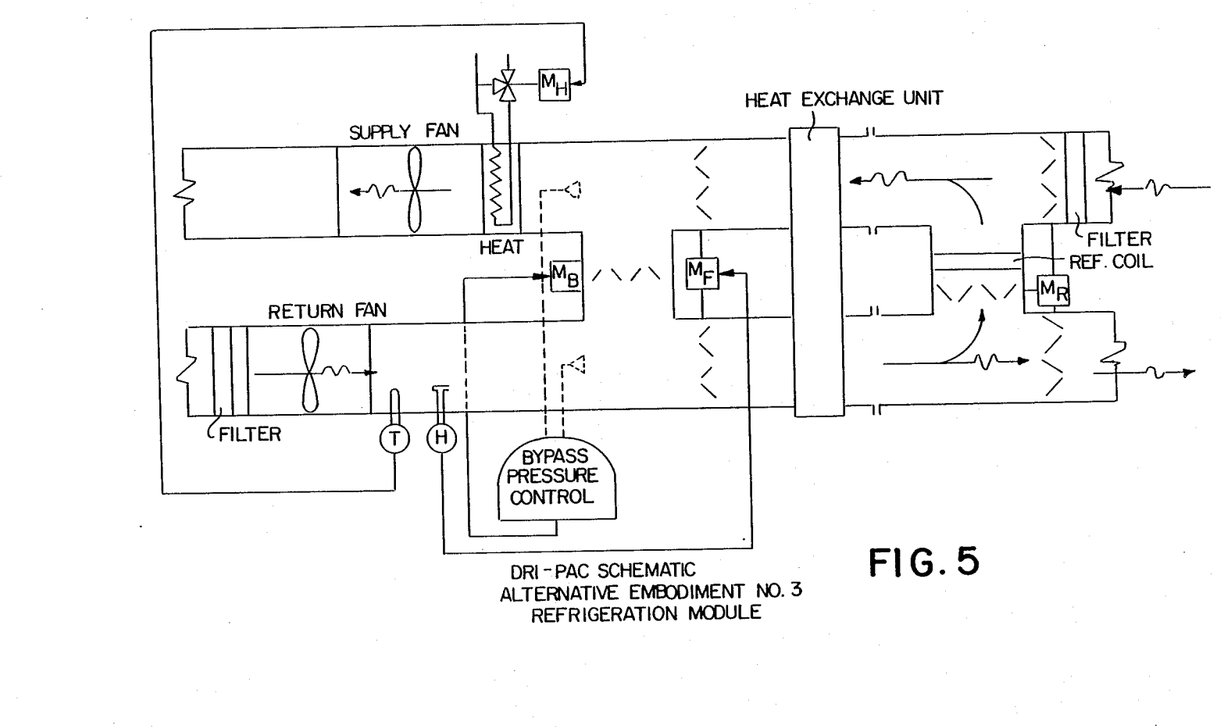
FIG. 5 is a schematic of the third alternative embodiment.

Referring to FIGS. 1 and 5, in still another alternate embodiment, two plenums 70 and 72 are joined to the exhaust and intake air connections 38 and 44 respectively of the unit. A refrigeration coil 74 and a shut-off damper 76 are mounted in series between these plenums 70 and 72 so that when the refrigeration coil damper 76 is open the exhaust air bypasses through the refrigeration coil 74.

Final exhaust/intake dampers 78 and 80 respectively are installed in each of these plenums at the connections to the final outside air ductwork.

In this embodiment the system may operate as described in the preferred embodiment. When the refrigeration coil damper 76 is closed and the final exhaust/intake dampers are opened. No air passes through the refrigeration coil and outside air flow is modulated in the usual fashion.

Operation in the mode of the preferred embodiment continues until the incoming outdoor air no longer is dry enough to satisfy the indoor moisture load.

At this point the "summer dehumidification mode" is initiated based on the reading from the humidity/sensor control H. In this mode the final exhaust and intake dampers 78 and 80 are simultaneously closed. The refrigeration coil bypass damper 76 is opened and the refrigeration coil 74 is energized. During this changeover sequence in the refrigeration module, normal operation of the intake, exhaust and bypass dampers is overridden.

The bypass damper 26 is driven shut while control of the intake/exhaust dampers is switched to the bypass pressure controller PS1 which previously controlled the return/supply bypass damper (in winter mode).

The modified air flow path is as follows. All of the return air is drawn through the return air fan and discharged through the exhaust damper. After passing through the damper the air passes through the "exhaust" side 32 of the heat recovery module 30, through the refrigeration coil 76 and damper 74 then directly back through the intake side 34 of the heat recovery module 30. From the heat recovery module the air flows through the intake face damper 42 and the intake/supply plenum to the reheat coil 50. Finally, the air is drawn through the supply fan 48 and discharged back to the defined environment.

This integration of the refrigeration coil with the module 30 results in a "run around" configuration where the same air flow passes through both sides of the heat recovery module.

The bypass pressure sensor/controller operates the exhaust/intake face damper while the bypass damper is driven closed. The exhaust/intake damper positions are regulated so that the total static pressure produced by the air passing in series through the exhaust face damper, exhaust side of the heat recovery module, the refrigeration coil, the intake side of the heat recovery module and intake face damper matches the predetermined fixed setting (as determined by fan performance curves as described for the preferred embodiment). Again the total pressure from the return/exhaust plenum to the supply/intake plenum must be held constant to hold the indoor air flow constant.

This run around configuration causes the refrigeration coil to act as a more efficient moisture removal device than can be obtained without the heat transfer module.

The power utilized in operating a refrigeration coil is spent doing two tasks: (1) Cooling the air (sensible cooling) and (2) Drying the air (latent cooling).

Typically refrigeration coils exhibit a sensible/latent split, as it is called, of 80%/20%. This means that 80% of the horsepower used to run the refrigeration unit is spent cooling the air and only 20% of the horsepower is dissipated cooling the air and only 20% of the horsepower is dissipated removing moisture. Using a refrigeration unit with such a sensible/latent split for moisture removal as its primary function is inefficient.

Eighty percent of the power used to operate the machine is essentially wasted performing unwanted cooling while only 20% is directed toward the useful work of moisture removal.

This sensible/latent split can be affected by the condition of the air entering the refrigeration coil. If the relative humidity of the air entering the refrigeration coil can be shifted upwardly the sensible/latent split will in turn shift toward more latent heat removal.

Because the return air coming from the pool space is normally only 50–60% R.H., the normal sensible/latent split will not change significantly.

If the return air entering the refrigeration coil were close to 100% R.H., the sensible/latent split would shift to almost all latent work and little sensible cooling.

This embodiment of the invention uses the run around configuration of the heat recovery module to precondition the return air to approach 100% R.H. before entering the refrigeration coil.

The limited amount of sensible cooling produced by the refrigeration coil at the intake side of the heat recovery module is transferred across to the exhaust side of the heat recovery module to pre-cool the return air before it enters the cooling coil.

During this pre-cooling process, the return air moisture content remains essentially the same, but because of the lower temperature the relative humidity shifts from the 50% or 60% level to almost 100% (saturated).

Now the saturated return air enters the cooling coil and the sensible/latent split exhibited by the coil will be more like 20%/80% respectively. This refrigeration/damper module offers peak efficiency and lower operating cost under all operating conditions.

When the outside air is dry enough the system reverts to the basic operational mode of dehumidification with ventilation using energy recovery. When the outside air becomes too moist to be useful for drying, the outside air is shut down. The "run around" refrigeration loop is employed with practically no power wasted on unwanted sensible cooling.

In a refined version of this "run around" configuration, manipulation of the heat recovery module results in the ability to adjust continuously the sensible/latent output ratio of the refrigeration coil.

Although the ability to operate the refrigeration coil at the maximum latent output possible may be desirable sometimes a variable amount of sensible cooling may be required to compensate for building heat gain (cooling load). This feature is attainable using a certain type of energy recovery device.

A heat pipe heat exchanger utilizes a series of refrigerant-charged tubes built into a coil such that a partition directs intake and exhaust air streams so that each is in contact with one half (lengthwise) of the tubes respectively.

Refrigerant is "boiled" from the liquid state on the warm air side migrates across the exhaust/intake partition and condenses in the cold air side of the heat pipe releasing the heat energy in this transfer process. Since the condensed liquid refrigerant must drain back to the warm air side the transfer process is effected by the tilt angle of the heat pipe tubes.

A steeper tilt angle makes the draining easier and in turn makes the heat transfer process more efficient. This characteristic of tilt vs. efficiency can be utilized to control how much heat is transferred from one air stream to the other.

In the run around configuration the return air relative humidity is shifted upwards by the pre-cooling effect across the heat transfer module. By varying the tilt angle of the energy recovery device with a motorized actuator the pre-cooling effect can be adjusted so that the relative humidity of the air entering the refrigeration coil in turn can be controlled. As the relative humidity is varied from the original return condition to the saturated level (100% relative humidity) the sensible output of the cooling coil will in turn be varied between its maximum and minimum levels. A heat pipe is used in conjunction with refrigeration coil.

Having described my invention what I now claim is:

1. A system for providing a continuous flow of air to control surface condensation, humidity and temperature in a defined environment which comprises:
   means to introduce return air into the system from the defined environment at a first humidity and first temperature; means to measure the humidity of said return air;
   means disposed within the system to exhaust one portion of said return air to ambient;
   means to recycle another portion of said return air;
   means to flow through the system intake air, said intake air at a second humidity and a second temperature;
   means to discharge continuously into the defined environment supply air at a third humidity and a third temprature;
   a heat recovery module having an exhaust side through which the return air flows and an inlet side through which the intake air flows;
   a refrigeration module having first and second zones, the first zone downstream of and in communication with the exhaust side of the heat recovery module, the second zone upstream of and in communication with the intake side of the heat recovery module, the second zone including means to cool the return air flowing therethrough;
   means to control the flow of the return air from the first zone to the second zone to cool said return air;
   means to flow said cooled recycled return air as intake air from the second zone through the intake side of the heat recovery module, said intake air in heat exchange relationship with the return air flowing through the exhaust side of the heat recovery module, to thereby cool the return air flowing through the exhaust side of the heat recovery module and to increase the relative humidity of said return air, which return air then flows through the second zone and means to control the flow rates of the return air and the intake air to discharge the supply air.

2. The system of claim 1 wherein the means to introduce the return air into the system comprises:
   a return fan which removes the return air from the defined environment and the means to exhaust and recycle the return air comprises a return/exhaust plenum, said plenum including an exhaust damper and a bypass damper, the bypass damper in communication with the common plenum, the exhaust damper in communication with ambient.

3. The system of claim 2 wherein the means to introduce the intake air into the system comprises a supply fan and the common plenum further comprises an intake damper, said intake damper in communication with ambient and the supply fan.

4. The system of claim 3 wherein the means to control the flow rates comprises:
   means to move variably the exhaust damper and the bypass damper between open and closed positions thereby controlling the flow rates of the exhaust air and the recycled return air, said exhaust damper responsive to the humidity of the return air and said bypass damper responsive to the static pressure across the return/exhaust plenum and the common plenum.

5. The system of claim 1 which comprises:
   means to maintain the defined environment at a negative pressure with respect to ambient.

6. The system of claim 1 wherein the means to control the flow rates of the return air and the intake air comprises:
   means to sense the static pressure loading across the means to introduce the return air and the means to introduce the intake air.

7. The system of claim 1 which comprises means to introduce intake air into the system from ambient.

8. The system of claim 1 which comprises means to combine intake air from ambient and the return air in a common plenum to form a combined air stream, the common plenum in fluid flow communication with the means to introduce the intake air and the means to recycle the return air.

9. The system of claim 1 wherein the means to cool the air in the second zone comprises a heat pipe heat exchanger.

10. The system of claim 1 which comprises means to flow all of the return air into the first zone and through the second zone.

11. The system of claim 1 which includes means to prevent introduction of ambient air into the system.

12. The system of claim 1 which comprises means to divert all of the air from the first zone into the second zone.

13. A method of controlling surface condensation, temperature and humidity in a defined environment which includes:
   (a) flowing return air from the environment into a system at a first temperature and a first humidity;
   (b) recyling as intake air at least a portion of the return air;
   (c) flowing intake air through the system;
   (d) placing dry cooled intake air in heat exchange relationship with the return air to increase the humidity of said return air;
   (e) cooling subsequently the return air of step (d) in a cooling zone to remove moisture therefrom, said cooled return air forming at least part of the cooled dried intake air;
   (f) controlling the flow rates of the intake air and the return air; and
   (g) discharging said cooled dried intake air as supply air into the defined environment at a third humidity and third temperature.

14. The method of claim 13 which includes:
controlling the flow rates of the return air and the intake air based on the static pressure loading across he return air and the inake air.

15. The method of claim 14 which includes:
maintaining the pressure in the defined environment negative with respect to ambient.

16. The method of claim 15 which includes:
maintaining return air flow at a greater rate than the supply air flow.

17. The method of claim 14 which includes:
placing the combined air stream in heat exchange relationship with a heat exchange medium prior to discharging said stream into the defined environment.

18. The method of claim 13 which includes:
introducing intake air into the system from ambient.

19. The method of claim 18 which includes:
placing the return air discharged from the return/exhaust plenum in heat exchange relationship with the intake air prior to said intake air entering the common plenum.

20. The system of claim 19 which includes:
cooling said intake air.

21. The method of claim 13 wherein the system includes a common plenum and which further includes:
combining the intake air from ambient and the return air in the common plenum to form a combined air stream and to introduce said air stream into the defined environment as supply air.

22. The method of claim 13 which includes:
recycling all of said return air through the cooling zone;

23. The method of claim 22 which includes:
preventing the introduction of ambient intake air into the system.

* * * * *